April 14, 1931. A. C. DOBRICK 1,800,608
VALVE
Filed May 12, 1927
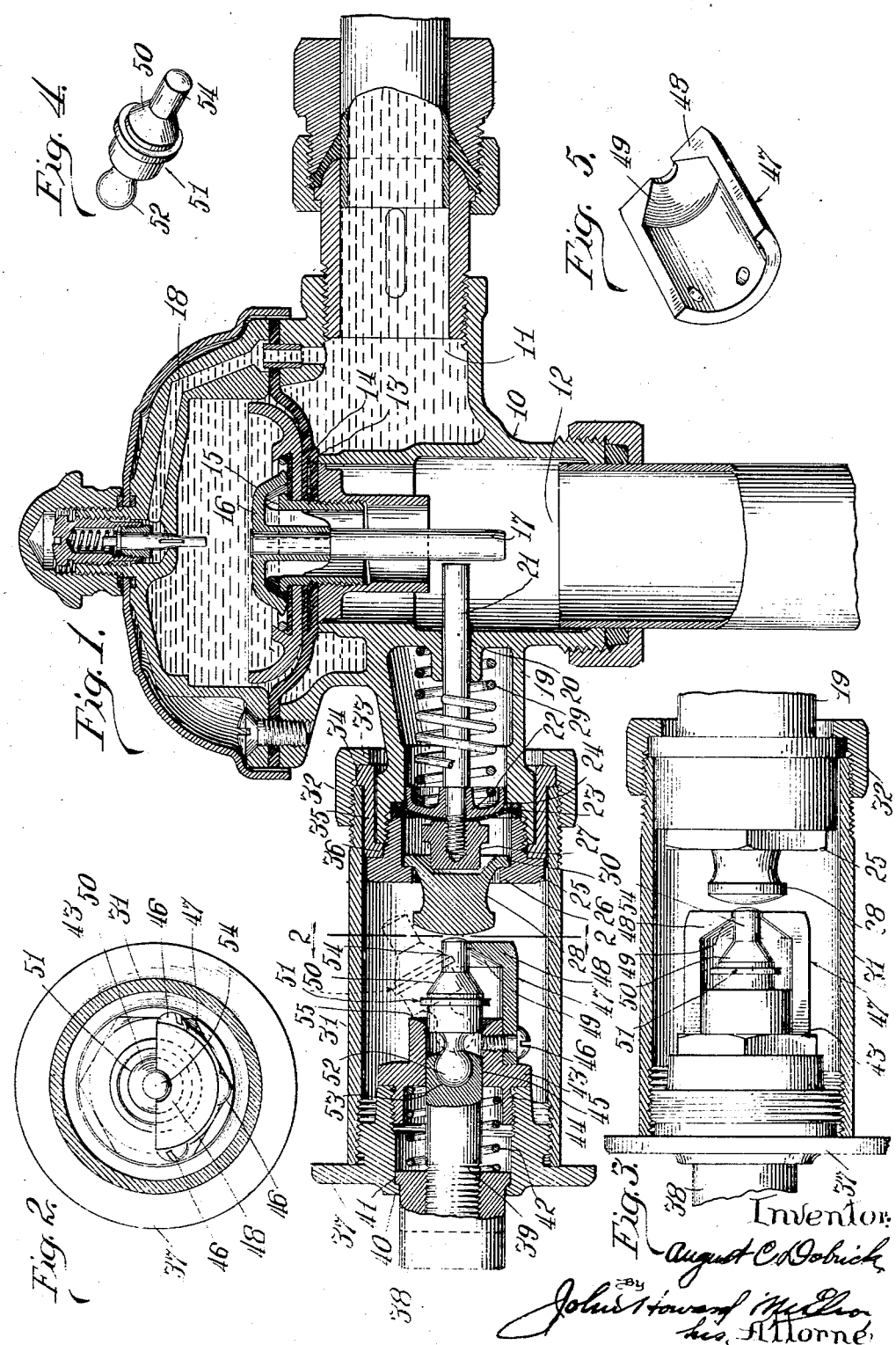

Patented Apr. 14, 1931

1,800,608

UNITED STATES PATENT OFFICE

AUGUST C. DOBRICK, OF CHICAGO, ILLINOIS, ASSIGNOR TO THE IMPERIAL BRASS MANUFACTURING COMPANY, OF CHICAGO, ILLINOIS, A CORPORATION OF ILLINOIS

VALVE

Application filed May 12, 1927. Serial No. 190,679.

My invention is concerned with certain new and useful improvements in valves intended at each operation to deliver a definite amount of fluid, such, for instance, as flush valves, and is designed to produce a simple and effective structure for the purpose described in which it is impossible to increase the amount of fluid delivered at a single operation by holding the manually-operated member in operating position.

To this end, it consists of a novel combination of elements that will be hereinafter fully described in the specification and then particularly defined in the claims.

To illustrate my invention, I annex hereto a sheet of drawings, in which the same reference characters are used to designate identical parts in all the figures, of which,—

Fig. 1 is a central, vertical, longitudinal section through a valve embodying my invention;

Fig. 2 is a section on line 2—2 of Fig. 1;

Fig. 3 is a horizontal sectional view showing a portion of the mechanism seen in Fig. 1; and Figs. 4 and 5 are perspective views of two novel elements employed in my invention.

I have shown the novel features of my invention as applied to a well-known flush valve, in which 10 is the casing casting having an inlet opening 11 and an outlet opening 12, to which the customary piping will be connected in the customary manner. Located in the casing 10 is an annular seat 13 for the main valve, which is formed by a flexible diaphragm 14 having located in the central portion thereof the apertured seat 15 for the tilting auxiliary valve 16, having its stem 17 extending down into the outlet passage 12, as will be readily apparent. In this type of valve, when the valve is closed, the parts are as seen in Fig. 1, and when the stem 17 of the tilting valve is moved to one side by the mechanism hereinafter described, the valve 16 is tilted off of its seat so that the water in the chamber above the diaphragm 14 is free to escape downward past the auxiliary valve 16 into the outlet, thus unbalancing the pressure on the diaphragm 14, so that it will be raised by the pressure of the water and allow the water to be discharged through the seat when the diaphragm is lifted. When the diaphragm is thus lifted, the water rises slowly through the passage 18 in the valve casing leading from the inlet 11 to the chamber above the diaphragm, so that the diaphragm descends slowly as the chamber above it is fitted through the passage 18, and the diaphragm is seated, stopping the flow, when this chamber is filled.

Projecting from one side of the casing 10 is the generally cylindrical portion 19 having the aperture 20 through which the operating pin 21 slides, the other end of the pin having secured thereon the cap or enlargement 22 cooperating with the flexible diaphragm 23, which is clamped against the annular offset 24 located near the outer end of the cylindrical portion 19 by the hollow nut 25, threaded therein, and having the inwardly-projecting annular flange 26 at its outer end. Outside of the flexible diaphragm 23, which is employed to prevent the passage of water, the pin 21 has screwed on the outer end the operating abutment or lug 27, which is held in engagement with the inner surface of the operating head 28 by the helically-coiled expanding spring 29 interposed between the inner end of the portion 19 and the cap 22. The head 28 has the annular flange 30 co-operating with the flange 26 to hold the head 28 yieldingly in place.

In the specific form of mechanism illustrated, the outer end of the portion 19 and the hollow nut 25 and the head 28 are enclosed in the cylinder 31. This cylinder 31 has threaded on its inner end the nut 32, which has the inwardly-projecting annular flange 33 co-operating with the outwardly-projecting annular flange 34 formed on the inner end of the short sleeve 35 surrounding the outer end of the portion 19. This flange 34 is clamped between the inner end of the cylinder 31 and the flange 33 of the nut 32. The inner end of the short sleeve 35 is provided with the inwardly-extending annular flange 36, which is caught between the annular flange 25 of the nut 26 and the outer cylindrical end of the portion 19, the connections just described serving as the means of supporting the cylinder 31 on the portion 19. Threaded into the inner end of the cylinder 31 is the cap 37, which has the annular passage therethrough in which is located the push piece 38, which is threaded on the end of the plunger 39. The cap 37 has at its outer end the inwardly-extending annular flange 40, which engages the outwardly-extending annular flange 41 formed on the inner end of the push piece 38 and engages the latter when it is in its extreme outer position, where it is normally held by the helically-coiled expanding spring 42 surrounding the plunger 39. The other end of the spring is engaged by the inner end of the nut or threaded sleeves 43, which has its reduced outer end 44 threaded into the inner end of the cap 37. Its reduced inner end is provided with the annular passage 45 for the inner end of the plunger 39. As best seen in Figs. 1 and 3, the reduced inner end of the nut 43 has secured thereto by the screw 46 a cam member 47, which has the general shape of half a cylinder, with its inner end partially closed by the inwardly-projecting semicircular flange 48, which has its inner side 49 inclined as seen to form a cam surface co-operating with the conical surface 50 of the trip member 51 pivoted by a ball-and-socket joint in the inner end of the plunger 39. This trip member has its outer end reduced to form a ball 52 mounted in the socket 53 formed in the outer end of the plunger 39, and when its body portion is pushed outward far enough so as to leave the sleeve 43, the trip member is then free to swing on the ball-and-socket joint. The trip member has the reduced inner end 54 which normally engages the outer end of the head 28. When the push piece 38 is shoved in, the thrust is transmitted through the plunger 39 and trip member 51 directly to the head 28, which in turn shoves the member 27 inward, thereby pushing the pin 21 inward far enough to swing the stem 17 of the tilting valve 16 far enough to open the valve and start the flush. When the parts have thus moved inward far enough to start the flush, the conical surface 50 of the trip member engages the inclined surface 49 of the member 47 and is forced to the dotted-line position shown in Fig. 1, where the pin 21 and head 28 are free to return to their normal position under the thrust of the spring 29, so that the flush will run its ordinary course, and if the push piece 38 is held in, no additional flushing action takes place, as the only way that an additional flush can be produced is to allow the original flush to be completed and the push piece 38 returned to its normal position, after which it can be thrust inward and the flush repeated, as before. When the plunger 39 returns under the thrust of the spring 42, the trip member 51 is brought into its normal position by reason of the engagement of the outer end of its cylindrical portion with the inwardly inclined end 55 of the inner end of the nut or connecting sleeve 43, which guides it into its normal position, where it extends into the passage 45 therethrough.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a flush valve, the combination with a secondary valve controlling the action of the fluid, of an intermediate member contacting the secondary valve to operate it, a movable actuating member for coacting with the intermediate member to force said intermediate member when it is moved thereby to engage the secondary valve stem at right angles to its principal axis to open said secondary valve, and connections between the intermediate member and the actuating member whereby only after the actuating member has moved the intermediate member to operative position it can be and is disengaged therefrom so that the actuating member has to be returned to normal position before the intermediate member can again be actuated.

2. In a flush valve, the combination with a secondary valve controlling the action of the fluid, of an intermediate member contacting the secondary valve to operate it, a movable actuating member for coacting with the intermediate member to force said intermediate member when it is moved thereby to engage the secondary valve stem at right angles to its principal axis to open said secondary valve, and connections between the intermediate member and the actuating member whereby only after the actuating member has moved the intermediate member to operative position it can be and is displaced relative to the intermediate member so that the latter can return to normal position while the actuating member remains displaced.

3. In a flush valve, the combination with a secondary valve controlling the action of the fluid, of an intermediate member contacting the secondary valve to operate it, a movable actuating member for coacting with the intermediate member to force said intermediate member when it is moved thereby to engage the secondary valve stem at right angles to its principal axis to open said secondary valve, said actuating member comprising a longitudinally movable push piece having a trip member mounted in the inner end thereof by a ball and socket joint and engaging the intermediate member, a stationary cam member which the trip member engages so that it can and will be cammed aside thereby breaking connection with said intermediate member only after it has been moved far enough to actuate the secondary valve, and means for bringing the trip member back into alignment with the push piece as the latter returns to its normal position.

4. In a flush valve, the combination with a secondary valve controlling the action of the fluid, of an intermediate member contacting the secondary valve to operate it, a movable actuating member for coacting with the intermediate member to force said intermediate member when it is moved thereby to engage the secondary valve stem at right angles to its principal axis to open said secondary valve, said actuating member comprising a longitudinally movable push piece having a trip member mounted in the inner end thereof by a ball and socket joint and engaging the intermediate member, a stationary cam member which the trip member engages so that it can and will be cammed aside thereby breaking connection with said intermediate member only after it has been moved far enough to actuate the secondary valve, and means for bringing the trip member back into alignment with the push piece as the latter returns to its normal position, said means comprising an annular cam surface on the inner end of the cylindrical housing for the push piece from which the body of the trip member is projected as the push piece is thrust in far enough to start the valve mechanism.

5. In a flush valve, the combination with a secondary valve controlling the action of the fluid, of an intermediate member contacting the secondary valve to operate it, a movable actuating member for coacting with the intermediate member to force said intermediate member when it is moved thereby to engage the secondary valve stem at right angles to its principal axis to open said secondary valve, said actuating member comprising a longitudinally movable push piece having a trip member movable in the inner end thereof and engaging the intermediate member, and a stationary cam member which the trip member engages so that it can and will be cammed aside thereby breaking connection with said intermediate member only after it has been moved far enough to acuate the secondary valve, said cam member comprising a semi-cylindrical extension of the housing for the push piece having a semi-cylindrical cam surface formed on the inner end thereof.

6. In a flush valve, the combination with an auxiliary valve, of means for moving the same consisting of two independently spring-pressed elements, one primary and the other secondary, not connected with the auxiliary valve and an interposed element movably attached to the primary element, said three elements being normally in alignment, so that longitudinal movement given to the primary element will through the interposed element impart longitudinal movement to the secondary element to open said auxiliary valve, means for preventing any relative movement of said interposed element until the three elements have moved in alignment far enough to open the auxiliary valve, and mechanism for giving said intermediate element a relative movement during the continued forward movement of the elements after the valve is opened to break the alignment and permit the secondary element's spring to return it to its normal position even if the primary element is held in its operated position.

7. In a flush valve, the combination with an auxiliary valve, of means for moving the same consisting of two independently spring-pressed elements one primary and the other secondary, not connected with the auxiliary valve and an interposed element movably attached to the primary element, said three elements being normally in alignment, so that longitudinal movement given to the primary element will through the interposed element impart longitudinal movement to the secondary element to open said auxiliary valve, means for preventing any relative movement of said interposed element until the three elements have moved in alignment far enough to open the auxiliary valve, and mechanism for giving said intermediate element a relative movement during the continued forward movement of the elements after the valve is opened to break the alignment and permit the secondary element's spring to return to its normal position even if the primary element is held in its operated position, said preventing means consisting of a cylindrical guide for the primary element and the interposed element, the end of said guide from which the interposed element projects having a beveled portion to bring it back into normal position.

In witness whereof, I have hereunto set my hand this 10th day of May, 1927.

AUGUST C. DOBRICK.